May 12, 1942.   P. J. BROWNSCOMBE   2,282,850
CAMERA
Filed April 1, 1940    2 Sheets-Sheet 1
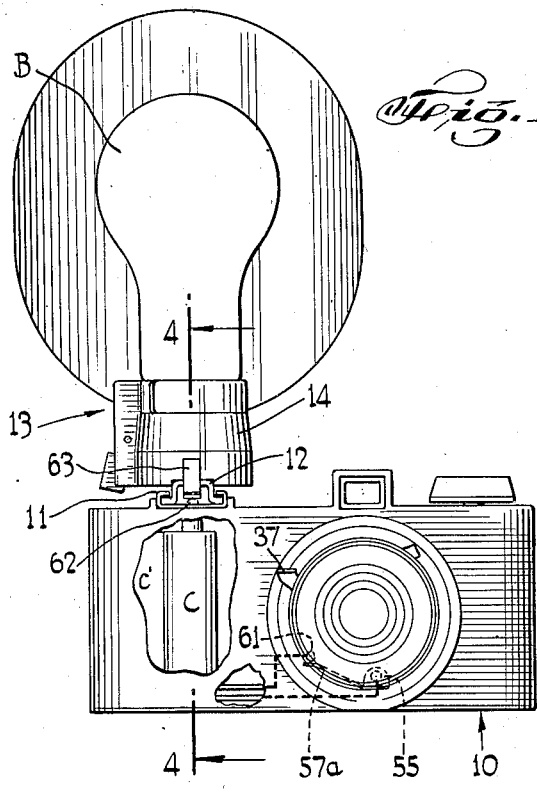
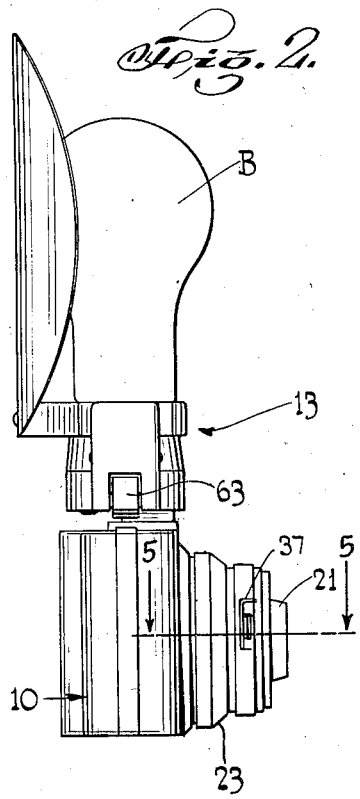
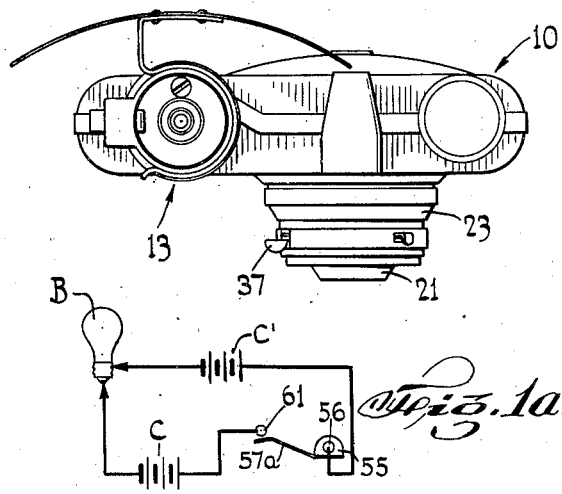
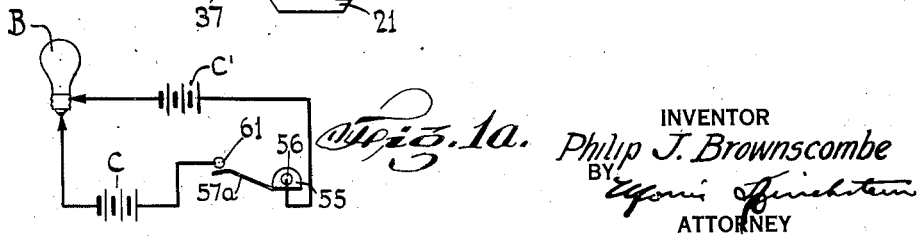
INVENTOR
Philip J. Brownscombe
BY
ATTORNEY

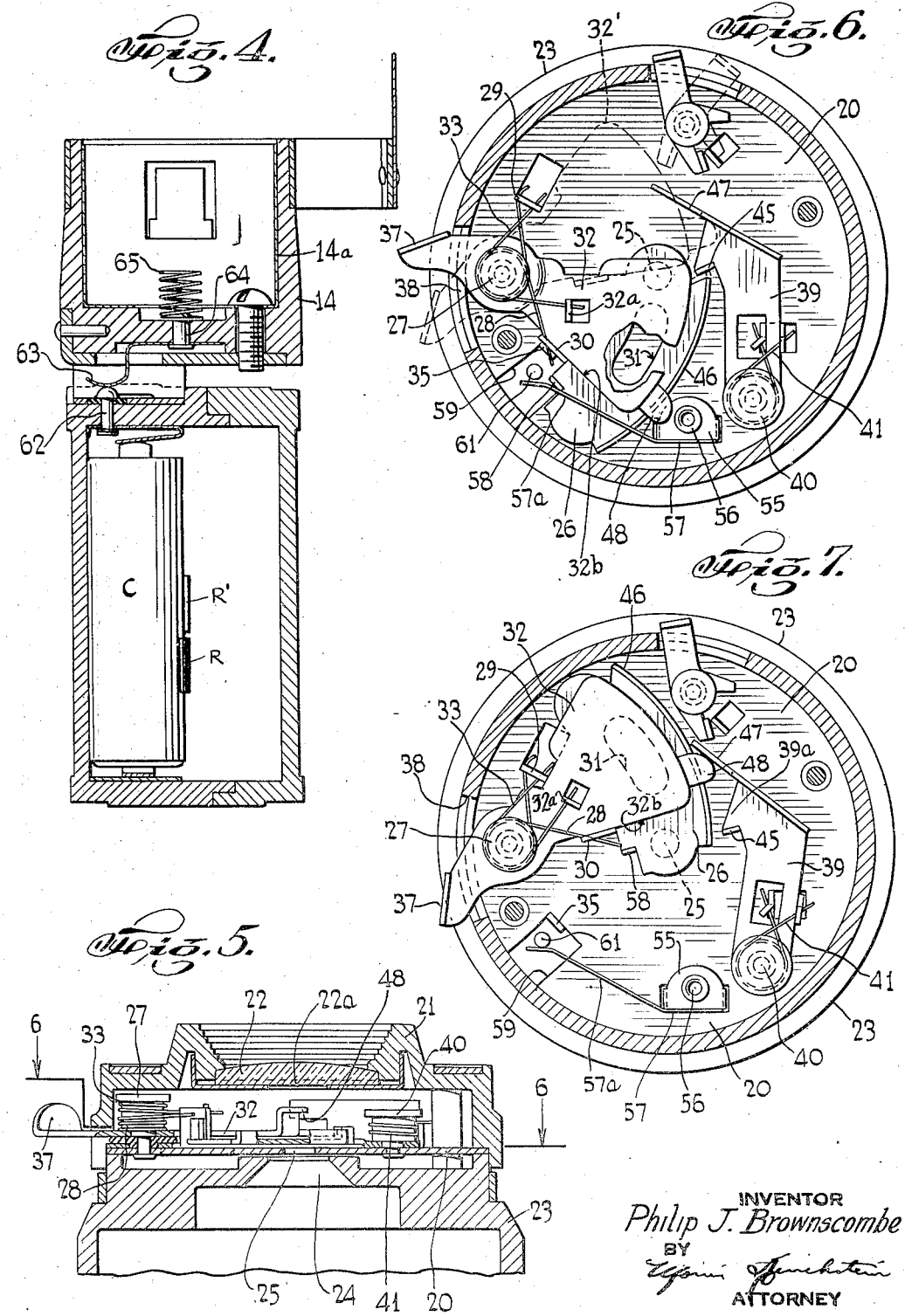

Patented May 12, 1942

2,282,850

UNITED STATES PATENT OFFICE 2,282,850

CAMERA

Philip J. Brownscombe, East Orange, N. J., assignor to Universal Camera Corporation, New York, N. Y., a corporation of Delaware Application April 1, 1940, Serial No. 327,122

7 Claims. (Cl. 67—29)

This invention relates generally to cameras. More particularly, my invention relates to an improved camera construction having novel means for synchronizing a flash bulb with the operation of the camera shutter.

One of the objects of my invention is to provide, in a camera, improved synchronization means between a flash bulb and the camera shutter, which shall be so arranged that the flash bulb will not be set off until the exposure blade of the shutter has actually started to move and is out of control of the operator so as to insure that the bulb will not be set off without at the same time making an exposure, and which shall be so designed as to compensate for the normal time lag of the flash bulb, to insure proper synchronization.

Another object of my invention is to provide, in a camera, improved synchronization means between a flash bulb and the camera shutter which shall be so designed that the flash contact will be continuously maintained for a sufficient period of operation of the shutter to insure ignition of the bulb and which may be satisfactorily employed when taking "instantaneous" as well as "bulb" exposure photographs.

Still another object of my invention is to provide, in a camera, improved synchronization means between a flash bulb and a camera shutter comprising a contact device which shall be so designed that the spring force employed for making the contact will be an aid to the shutter movement so as to increase the reliability of operation thereof rather than to impede the shutter action.

Other objects of this invention will in part be obvious and in part hereinafter pointed out.

The invention accordingly consists in the features of construction, combinations of elements, and arrangement of parts which will be exemplified in the construction hereinafter described, and of which the scope of application will be indicated in the claims.

In the accompanying drawings, in which is shown one of the various possible embodiments of this invention:

Fig. 1 is a front elevational view of a camera and a photo-flash unit effectively attached thereto and embodying my invention and having a portion of the camera casing broken away to disclose the interior construction thereof;

Fig. 1a is a schematic wiring diagram;

Fig. 2 is a side elevational view thereof;

Fig. 3 is a top plan view thereof;

Fig. 4 is an enlarged cross-sectional view taken substantially on the line 4—4 of Fig. 1;

Fig. 5 is an enlarged cross-sectional view taken substantially on the line 5—5 of Fig. 2;

Fig. 6 is a cross-sectional view taken substantially on the line 6—6 of Fig. 5; and Fig. 7 is a view similar to Fig. 6 but illustrating a step in the operation of my invention.

Referring now in detail to the drawings, I have shown any suitable type of photographic still camera 10 provided with an attachment clip 11 adapted to receive therein a corresponding attachment member 12 forming a part of a photoflash unit 13. The said flash unit 13 may be of any suitable design comprising a flash bulb B mounted in a suitable socket 14, such as for example the type shown and described in the copending application, Serial No. 316,800, filed February 1, 1940, by Richard K. Lotz, for Bulb sockets.

The camera 10 may be of the type disclosed and described in the co-pending application, Serial No. 315,291, filed January 24, 1940, by Richard K. Lotz for Camera shutters, in which there is shown a shutter mechanism constructed and arranged as illustrated in Figs. 5 to 7 of the drawings. The said shutter mechanism comprises a base plate 20 mounted in a shutter housing, the said housing comprising the part 21 having a lens aperture 22a and supporting a lens 22, and the part 23 provided with a light aperture 24 in optical alignment with the lens 22 and lens aperture 22a. The base plate 20 is provided with an aperture 25 in optical alignment with the apertures 22a and 24.

An exposure blade 26 is provided which is freely mounted on a pivot member 27, fixed to the base plate 20. The exposure blade 26 is normally maintained in such position that the aperture 25 will be completely covered thereby, as shown in Fig. 6 of the drawings. A wire spring 28 is so wound around the pivot 27 and in such direction that the opposite ends thereof will exert a resilient force against a fixed projection 29 attached to the base plate 20, and against a fixed projection 30 on the exposure blade 26. This will cause the said spring 28 to normally urge the rotational movement of the exposure blade 26 in a counter-clockwise direction (as viewed from Figs. 6 and 7) about the pivot 27. The exposure blade 26 is provided with an arcuate slot 31 so positioned and of such size as to uncover the aperture 25 during a predetermined period of rotational travel of the said exposure blade 26.

The normal tendency of the exposure blade 26 to travel in a counterclockwise direction is prevented by the following means. Freely rotatably mounted on the pivot 27, and overlying the exposure blade 26, is a manually operatable mask blade 32. A second wire spring 33 is wound around the pivot 27 in an opposite direction from that of the spring 28, and arranged with its opposite ends resiliently engaging the fixed projection 29 and a fixed projection 32a on the blade 32, to normally urge the pivotal movement of the mask blade 32 in a clockwise direction about the pivot 27. The spring 33 is made stronger than the spring 28, with the result that the trailing edge 32b of the mask blade 32 will contact the fixed projection 30 on the exposure blade 26 to urge the movement of the said blade 26 in a clockwise direction with the blade 32 and against the normal action of the spring 28. A fixed projection 35 on the base plate 20 limits the pivotal movement of both blades 26 and 32 in a clockwise direction, so that, normally, both blades will be in the position shown in Fig. 6. The mask blade 32 is provided with an operating tab 37 projecting through an opening 38 in the shutter housing to the outside of the camera. As described in the said co-pending application, Serial No. 315,291, it is thus seen that when the mask blade 32 is manually rotated in a counter-clockwise direction against the action of the spring 33, the exposure blade 26 will always be free to travel in the same direction due to the normal action of the spring 28, and when downward pressure on the tab 37 is released, the blades 26 and 32 will be restored to their original position against the abutment 35.

A locking pawl 39 is pivotally mounted on the base plate 20 by means of the pivot 40. A wire spring 41, wound around the shank of the pivot 40, normally urges the counterclockwise rotational movement of the pawl 39. It is noted that the said pawl 39 is provided with an upstanding portion 39a disposed in the path of movement of the blade 26 and at the same time out of the path of movement of the blade 32. The said pawl portion 39a is provided with an upwardly extending projection 45 designed to contactively engage a raised peripheral ridge 46 on the blade 26. The pawl 39 is also provided with an upstanding wall 47 angularly disposed, as shown, to serve as a cam member to cause the said pawl 39 to rotate in a clockwise direction against the action of the spring 41 when engaged by a finger portion 48 of the blade 32. The said finger 48 may be offset from the plane of the body of the blade 32 to clear the ridge 46 as well as the projection 45. The finger 48 is so positioned that when it strikes the cammed wall 47 to move the pawl 39 out of the path of movement of the blade 26, the trailing edge 32b of the blade 32 will have moved past the aperture 25 to expose the same during the time when the slot 31 of the blade 26 passes thereover. A portion of the cammed wall 47 is provided with a notch 60 to permit the leading portion of the blade 32 to freely pass therethrough. As described in the said co-pending application, Serial No. 315,291, the above described operation of the shutter mechanism is adapted for use for taking "bulb" or "time" exposures, as well as for "instantaneous" snapshots.

In accordance with my invention, I have provided the following means whereby the operation of the camera shutter as above described is synchronized to energize a flash bulb B which will remain continuously energized for the entire period of operation of the shutter, including the time when the slot 31 uncovers the aperture 25. A member 55, made of electrically conductive material, is fixedly attached to the metallic base plate 20 by any suitable means, such as by the hollow rivet 56. The said contact member 55 comprises an upstanding integral portion 57 having a resilient extending arm 57a. The said arm 57a is disposed in the path of and is adapted to be contactively engaged by a projecting lip 58 on the blade 26. The arm 57a is so designed that normally it will be resiliently urged in a direction toward said lip 58, so that when the shutter is in its initial position, as shown in Fig. 6, the said lip 58 will move the finger portion 57a in a counter-clockwise direction against its normal resilient force. Rigidly mounted on the shutter housing 23 and projecting upwardly through a notched portion 59 in the base plate 20, is a contact pin 61. The said contact pin 61 is so positioned that when the shutter is in its normal inactive position, as in Fig. 6, the arm 57a of the contact 55 will be out of contact therewith.

Mounted in the camera casing and held in position by resilient clips R and R' is a source of current supply comprising the batteries C and C' adapted to furnish the necessary current for energizing the flash bulb B. The camera casing is made of Bakelite or other similar material. As shown in Fig. 1a of the drawings, one pole of the battery C is connected to the contact pin 61, while the other pole of the same battery is connected to the bulb tip. One pole of the battery C' is connected to the arm 57a of the contact member 55 through the metallic plate 20, while the opposite pole of the battery C' is connected to the shell 14a of the socket 14 of the flash bulb B through the clip 11. A rivet contact 62 disposed within the area of the clip member 11, and engaged by the resilient contact finger 63, electrically connects the tip of the flash bulb by means of the rivet 64 and spring contact 65, as shown and described in the said co-pending application, Serial No. 316,800. It is thus seen from the above description that when the finger portion 57a of the contact 55 is permitted to contactively engage the pin 61, the circuit from the battery C, C' to the flash bulb B will be completed and energization of the flash bulb will result.

The operation of my improved mechanism designed for synchronizing the action of the shutter with the flash bulb will now be described. In Fig. 6, the shutter mechanism is shown in its initial position with the aperture 25 covered by both blades 26 and 32, and with the contact arm 57a out of contact with the pin 61. When the shutter operating tab 37 is pressed downwardly, the mask blade 32 is caused to rotate in a counter-clockwise direction against the action of the spring 33. As the trailing edge 32b of the blade 32 moves away from the projection 30 on the blade 26, the said blade 26 will also tend to rotate in a counter-clockwise direction due to the normal action of the spring 28. However, as shown in Fig. 6, the exposure blade 26 will be prevented from rotational movement due to the projection 45 of the pawl 39, with the result that while rotation of the exposure blade 26 will be prevented, continued rotation of the blade 32 will be permitted. When the said blade 32 has been manually rotated to its dotted line position shown at 32' in Fig. 6, the finger 48 thereof will have contactively engaged the cammed wall 47 to rotate the pawl 39 in a clockwise direction resulting in the withdrawal of the projection 45 out of the path of travel of the ridge 46. This will free the exposure blade 26 so that it will quickly rotate in a counter-clockwise direction with the full force of the spring 28. Upon such movement of the blade 26, the projection 58 thereof will be moved away from the resilient arm 57a of the contact member 55 to permit the said arm 57a, due to its normal resilient tendency, to contactively engage the pin 61 and thereby complete the electrical circuit between the flash bulb and the source of current C, C'. The finger 48 on the blade 32 is so positioned that when it strikes the cammed wall 47, as shown in Fig. 7, to move the pawl 39 out of the path of movement of the blade 26, the trailing edge 32b of the blade 32 will have moved past the aperture 25 so that the said aperture 25 will be exposed during the time when the slot 31 of the blade 26 passes thereover.

Upon release of the tab 37, both blades 26 and 32 will be resorted to their original positions, as shown in Fig. 6, due to the action of the stronger spring 33. In such original position, the projection 58 will move the arm 57a out of contact with the pin 61, to thus break the circuit between the flash bulb and the source of current.

It is noted that, in accordance with my invention, the flash bulb B will not be energized until the exposure blade 26 has actually started to move. It is also noted that energization of the flash bulb will take effect regardless of the speed with which the tab 37 is pressed. Also, in accordance with my invention, it will be impossible to open the shutter without making contact with the flash bulb. Another advantage in my improved method and means for synchronization as above described lies in the fact that the electrical circuit will be completed before the exposure of the opening 25 begins, in order to allow for the inherent time lag of the flash bulb en-ergization. At the same time it is noted that contact is continuously maintained throughout the movement of the shutter, thus obviating any possibility of misfire because of poor contact. Another important advantage in my improved synchronization mechanism is to be found in the fact that, because of its design, as described above, the starting inertia of the exposure blade 26 is aided by the resilient contact arm portion 57a.

It will thus be seen that there is provided a device in which the several objects of this invention are achieved, and which is well adapted to meet the conditions of practical use.

As various possible embodiments might be made of the above invention, and as various changes might be made in the embodiments above set forth, it is to be understood that all matter herein set forth or shown in the accompanying drawings is to be interpreted as illustrative and not in a limiting sense.

Having thus described my invention, I claim as new and desire to secure by Letters Patent:

1. In a camera having a shutter housing wherein is disposed a shutter comprising a movable blade, said camera being adapted to be used with a photo-flash bulb, means for synchronizing the actuation of said flash bulb with the operation of said shutter, said synchronizing means comprising a source of current supply, a fixed contact member connected to said current source, a switch member normally adapted to engage said contact member, means for elecctrically interconnecting said switch member to said current source to complete a circuit, and means associated with said shutter blade disposed within said housing for maintaining said switch member out of engagement with said fixed contact member to break said circuit at such times when the shutter is in its initial inactive position.

2. In a camera having a shutter housing wherein is disposed a shutter comprising a movable blade, said camera being adapted to be used with a photo-flash bulb, means for synchronizing the actuation of said flash bulb with the operation of said shutter, said synchronizing means comprising a source of current supply, a fixed contact member within said housing connected to said current source, a switch member within said housing normally adapted to engage said contact member, means for electrically interconnecting said switch member to said current source to complete a circuit, and means for maintaining said switch member out of engagement with said fixed contact member to break said circuit at such times when the shutter is in its initial inactive position.

3. In a camera having a shutter housing wherein there is disposed a shutter comprising a movable blade, said camera being adapted to be used with a photo-flash bulb, means for synchronizing the actuation of said flash-bulb with the operation of said shutter, said synchronizing means comprising a fixed contact member electrically insulated from said movable blade and having at least a portion thereof disposed within said housing, and a switch member rigidly mounted within said housing and having a resilient arm thereof normally adapted to be pressed against said fixed contact member, said resilient arm lying in the portion of the path of travel of said movable blade adjacent its initial inactive position whereby said blade maintains said arm out of engagement with said fixed contact member until said blade has started its movement.

4. In a camera having a photo-flash bulb and a shutter housing provided with an aperture for admitting light to photographic film contained within the camera, the combination of a movable shutter blade which is so constructed and arranged as to move past said aperture and means for synchronizing the actuation of said flash bulb with the operation of said shutter blade, said synchronizing means comprising a source of current supply, a fixed contact member connected to said current source, a switch member normally adapted to engage said contact member, and means for electrically interconnecting said switch member to said current source to complete a circuit for energizing said photo-flash bulb, said movable shutter blade being so disposed in its initial inactive position as to engage said switch member and maintain said member out of engagement with said fixed contact member whereby to break said circuit, said movable shutter blade being so disposed subsequent to movement from its initial inactive position as to allow said switch member to engage said contact member to complete said circuit.

5. In a camera having a photo-flash bulb and a shutter housing provided with an aperture for admitting light to photographic film contained within the camera, the combination of a movable shutter blade which is so constructed and arranged as to move past said aperture and means for synchronizing the actuation of said flash bulb with the operation of said shutter blade, said synchronizing means comprising a source of current supply, a fixed contact member connected to said current source, a switch member including a resilient arm normally adapted to engage said contact member, means member including a resilient arm normally for electrically interconnecting said switch member to said current source to complete a circuit for energizing said photo-flash bulb, said movable shutter blade having a projection thereon which during the initial inactive position of the movable shutter blade engages said resilient switch member and maintains said member out of engagement with said fixed contact member whereby to break said circuit, said projection being so disposed subsequent to movement of said movable shutter blade from its initial inactive position as to allow said resilient switch member to engage said contact member to complete said circuit.

6. In a camera having a photo-flash bulb and a shutter housing provided with an aperture for admitting light to photographic film contained within the camera, the combination of an apertured movable shutter blade which is so constructed and arranged that during the travel of said shutter blade the aperture therein will move past the aperture in said shutter housing and means for synchronizing the actuation of said flash bulb with the operation of said shutter blade, said synchronizing means comprising a source of current supply, a fixed contact member connected to said current source, a switch member, normally adapted to engage said contact member, and means for electrically interconnecting said switch member to said current source to complete a circuit for energizing said photoflash bulb, said movable shutter blade being so disposed in its initial inactive position as to engage said switch member and maintain said member out of engagement with said fixed contact member whereby to break said circuit, said movable shutter blade being so disposed subsequent to movement from its initial inactive position as to allow said switch member to engage said contact member to complete said circuit, said apertured shutter blade, the aperture in said shutter housing and said switch member being so relatively positioned that the switch member will engage the fixed contact member to complete said circuit when said shutter blade is moved from said initial inactive position before the aperture in said shutter blade moves past the aperture in said shutter housing whereby to compensate for an inherent time lag of the flash bulb.

7. In a camera having a photo-flash bulb and a housing provided with an aperture for admitting light to photographic film contained within the camera, the combination of a pivotally mounted movable shutter blade which is so constructed and arranged as to move past said aperture and means for synchronizing the actuation of said flash bulb with the operation of said shutter blade, said synchronizing means comprising a source of current supply, a fixed contact member connected to said current source and a movable contact device comprising a resilient member, said resilient member having a portion rigidly mounted in said shutter housing and a free portion which is normally adapted to be pressed against said fixed contact member, means for electrically interconnecting said contact device to said current source whereby when said movable contact device engages said fixed contact member a circuit will be closed to energize said flash bulb, said shutter blade being movable between two extreme positions, said resilient arm lying in the path of travel of said shutter blade near one extreme position thereof at which said shutter blade is so disposed as to prevent passage of light from said aperture to said film, whereby said shutter blade maintains said circuit open until after said blade has started its movement towards its other extreme position.

PHILIP J. BROWNSCOMBE.